Patented Jan. 19, 1943

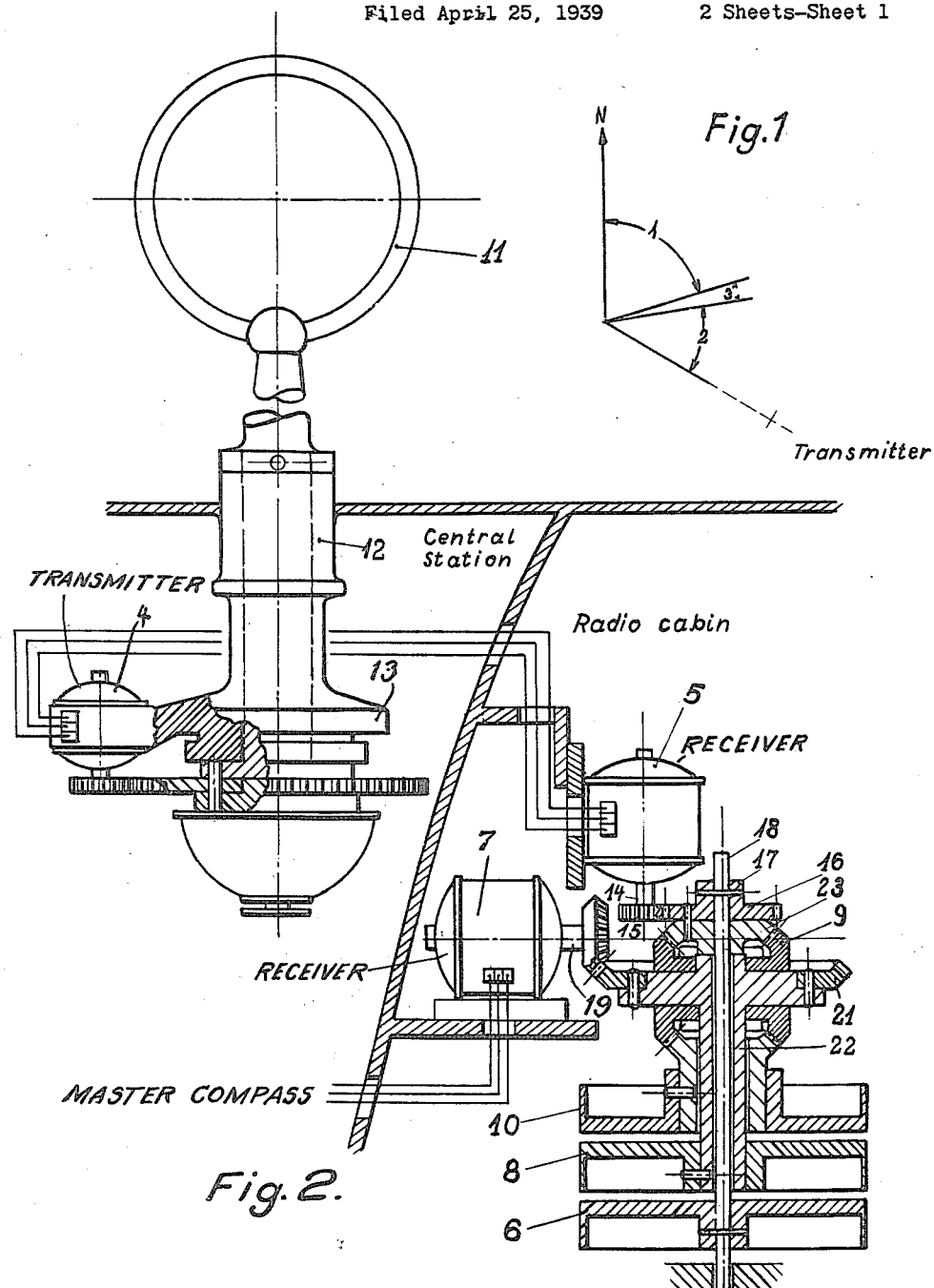

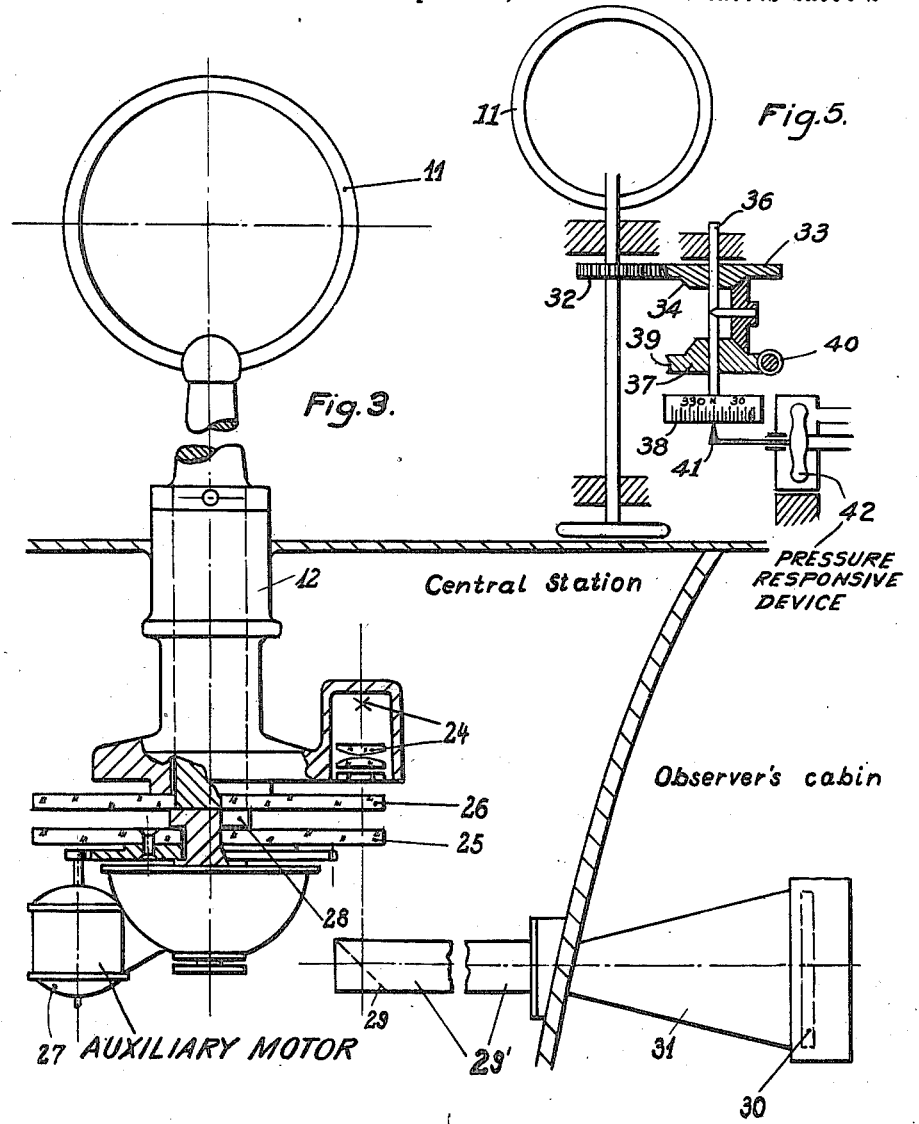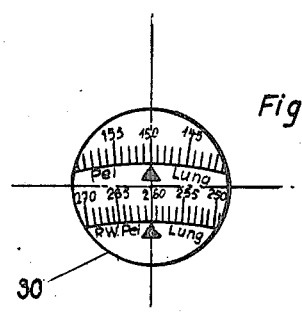

2,308,936

UNITED STATES PATENT OFFICE 2,308,936

RADIO DIRECTION FINDING MEANS

Hans Schuchardt and Carl Lüdke, Berlin-Steglitz, Germany; vested in the Alien Property Custodian Application April 25, 1939, Serial No. 269,958
In Germany April 26, 1938

4 Claims. (Cl. 250—11)

The present invention relates to radio direction finding means.

When visibility is nil or poor it is extremely difficult, if not impossible to find the instantaneous position of a marine craft or aircraft so as to enable the correct course to be followed. To overcome this difficulty it has been proposed to take bearings on two radio stations of known position and from the data obtained to ascertain the direction of an aircraft. If the azimuth, under which the corresponding station appears, is placed on a map against each station, the vectors of the angles intersect at a point on the map which represents the location of the aircraft at the moment the readings are taken. Thus to enable the individual bearings to be taken in the manner indicated, it is necessary to determine the azimuth of the transmitters.

It is an object of the invention to provide a means which enables a direct reading to be made of the sum of the bearing angle and the course angle.

By a bearing angle is meant an angle which includes the bearing direction and the longitudinal axis of the craft carrying the directional frame. It is however necessary for the purpose of navigation to ascertain the angle, which includes the bearing direction and the northern direction.

It is a further object of the invention to enable the instantaneous drift to be indicated also.

In this invention there is provided in a radio direction finding system including a device for taking bearings and a means for ascertaining the course angle, co-operating indicator means under the combined control of said bearing-taking device and said means for ascertaining the course angle and adapted to give an indication of the true bearing.

In the accompanying drawings:

Figure 1 is a diagram illustrating the principles on which the invention is based.

Figure 2 is a part-sectional elevation of a device in accordance with an embodiment of this invention.

Figure 3 is a part-sectional elevation of another embodiment of the invention.

Figure 4 is a detail and illustrates the glass disc on Figure 3.

Figure 5 is a diagrammatic illustration of still another embodiment of the invention.

Referring to the drawings, Figure 1 shows that the azimuth is made up in a simple manner of the course angle 1 and the angle 2 through which the frame aerial is turned. It is also assumed in these drawings that bearings are being taken from an aircraft which has an instantaneous angle of drift 3 in relation to a fixed set course with reference to which the position of the craft is to be found.

Hitherto these two or three angles have been ascertained separately and then added together. In this invention however, the values of the bearing angle 1 and the course angle 2 are supplied to a common summation device which permits a direct reading to be made of the total value, i. e. of the true bearing.

This desideratum can be carried into effect in a number of ways some of which are illustrated in Figures 2 to 5 of the accompanying drawings.

Figure 2 is an embodiment particularly intended for use on ships, and this comprises two sets of apparatus, one of which is located at the central station on the ship and the other in the operator's cabin. The apparatus at the central station includes a frame aerial 11 for taking bearings, this frame being mounted for rotation on a bearing 12 carrying a divided circle 13.

The numeral 4 denotes a bearing transmitter or motor which is arranged to transmit an indication corresponding to the position of the frame 11 to the radio cabin where it is received by a receiver 5. This receiver has a shaft 14 carrying a gear 15 in mesh with a toothed pinion 16. This pinion has a collar 17 secured to one end of a spindle 18 which adjacent its other end carries a dial 6 rotatable therewith.

An indication corresponding to the course angle is electrically transmitted to a second receiver 7 in the radio cabin, this receiver having a shaft 19 carrying a planet gear wheel 20 which meshes with a sum wheel 21. This latter is secured to a sleeve 22 loosely mounted around the spindle 18, and this sleeve 22 carries a dial 8 which is rotated so as to indicate the course angle.

Secured to the pinion 16 is a toothed member 23 which is adapted to operate a differential gear, generally designated 9, which is also operated by the wheel 21. Thus impulses corresponding to both the course angle and the bearing angle act on the differential 9, and in the result the dial 10 is rotated by an amount enabling the true bearing to be read off this dial. Accordingly, dials 8, 6 and 10 give respectively direct indications of the course, the bearing taken, and the true bearing.

Figure 3 illustrates another embodiment of an apparatus for use on ships. In this case the data are transmitted by optical means.

The apparatus at the central station includes an optical illuminating system generally designated 24 by means of which a beam of light is projected through two divided circles 25 and 26. An auxiliary motor 27, which is controlled in accordance with the course angle, is adapted to rotate the circle 25 by the amount of this angle and is suspended, with the latter, from the hub 28 of the frame 11. Thus the circle 25 is also rotated by an amount corresponding to the frame angle, and the summation is effected directly at the bearing finding central station.

The divisions on the circles 25 and 26 are etched into the glass of which these circles are composed and are coloured black. The light beam passing through these circles from the system 24 is reflected at a reflecting surface 29 of an optical transmission system generally designated 29'. The beam is reflected into the observer's cabin where it is observed on a ground glass disc 30 in an eye piece 31.

The image observed has the appearance illustrated in Figure 4.

The apparatus illustrated in Figure 5 is particularly intended for use in connection with aircraft, and is a typical example of a group of devices falling within the invention in which a dial indicating the true bearing is adjusted by an amount corresponding to the course angle, and the reading markings cooperating with the dial are rotated in accordance with the angle of the frame by means of which bearings are taken. Since it is only essential that there shall be a relative rotation, between the parts responsive to the two measurements, it is obvious that the dial could be rotated in accordance with the bearing angle and the markings adjusted in accordance with the course angle.

In Figure 5, 11 again denotes the frame aerial by which bearings are taken, and the movement of this frame is transmitted by means of a gear wheel 32 to a further gear wheel 33. The wheel 33 has a bevel toothed boss 34 meshing with a planet wheel 35 which is adapted to rotate about a spindle 36 when a second bevel pinion 37, arranged around this spindle, is stationary. In this way the movement of the frame 11 is transmitted to an annular scale 38 secured to the spindle 36.

The bevel pinion 37 also has a part 39 in the form of a worm wheel and this co-operates with a worm 40.

This arrangement is applicable to a particularly widely-used method of position finding on an aircraft.

Thus the compass kettle is rotated by an amount corresponding to the real course, and any deviation of the aircraft from this course is indicated directly to the pilot by means of a differential pressure meter so that the pilot has only to take care that there is no deviation from the zero line of this pressure meter. The course itself is ascertained from the setting of the compass kettle, and this can be read off from a dial on the course transmitter. The worm 40 is connected to this transmitter by means of a flexible shaft. Thus the rotation of the scale 38 corresponds to the sum of the true course angle and the angle of the frame 11, and this sum is indicated on the scale 38 by a marker 41.

Means are also provided for displacing marker 41 for compensating a deviation from the course, which must be taken care of in view of the fact that the course is permanently set. Thus the marker 41 is secured to a capsule 42 which is subjected to the differential pressure of a telecompass. The transmitter azimuth can therefore be read off the scale 38 where it is indicated by the marker 41.

What we claim as our invention and desire to secure by Letters Patent of the United States is:

1. In a radio direction finding system a remote transmission receiver for the bearing angle, a remote transmission receiver for the course angle, a dial for indicating the true bearing, a second dial for indicating the bearing angle, a third dial for indicating the course angle, transmission means including a pair of coaxial driving shafts respectively for transmitting the movement of the bearing receiver to said second dial and for transmitting the movement of the course receiver to said third dial, and a differential gear including a third driving shaft adapted to impart a combined movement corresponding to the course angle and the bearing angle to said first dial.

2. In a radio direction finding system, a remote transmission receiver for the bearing angle, a remote transmission receiver for the course angle, a dial for indicating the true bearing, a second dial for indicating the bearing angle, a third dial for indicating the course angle, transmission means including a pair of coaxial driving shafts respectively for transmitting the movement of the bearing receiver to said second dial and for transmitting the movement of the course receiver to said third dial, and means including a third driving shaft adapted to impart a combined movement corresponding to the course angle and the bearing angle to said first dial.

3. In a radio direction finding system, a remote transmission receiver for the bearing angle, a remote transmission receiver for the course angle, a dial for indicating the true bearing, a second dial for indicating the bearing angle, a third dial for indicating the course angle, transmission means including a pair of shafts respectively for transmitting the movement of the bearing receiver to said second dial and for transmitting the movement of the course receiver to said third dial, and means including a third shaft to impart a combined movement corresponding to the course angle and the bearing angle to said first dial.

4. In a radio direction finding system, a remote transmission receiver for the bearing angle, a remote transmission receiver for the course angle, a dial for indicating the true bearing, separate indicators, means for transmitting the movement of the bearing receiver and the course receiver to said separate indicators, and a differential transmission gear for imparting a combined movement from said bearing receiver and said course receiver to said dial.

HANS SCHUCHARDT.
CARL LÜDKE.